United States Patent [19]

Hall, III

[11] Patent Number: 4,614,132
[45] Date of Patent: * Sep. 30, 1986

[54] SINGLE CENTERLINE CROSS DRIVE STEERING TRANSMISSION

[75] Inventor: Arthur Hall, III, Indianapolis, Ind.

[73] Assignee: General Motors Corporation, Detroit, Mich.

[*] Notice: The portion of the term of this patent subsequent to Sep. 30, 2003 has been disclaimed.

[21] Appl. No.: 668,418

[22] Filed: Nov. 5, 1984

[51] Int. Cl.$^4$ ................. F16H 37/06; F16H 47/04
[52] U.S. Cl. .......................... 74/720.5; 74/687
[58] Field of Search ............ 74/687, 720, 720.5, 74/714, 677, 606 R

[56] References Cited

U.S. PATENT DOCUMENTS

| 3,253,688 | 5/1966 | Livezey | 74/720.5 X |
|---|---|---|---|
| 3,274,946 | 9/1966 | Simmons | 103/161 |
| 3,292,458 | 12/1966 | Livezey | 74/763 |
| 3,303,723 | 2/1967 | Ruf | 74/720.5 X |
| 3,378,119 | 4/1968 | Schaefer | 74/720.5 X |
| 3,383,953 | 5/1968 | Christenson | 74/720.5 |
| 3,425,296 | 2/1969 | Livezey | 74/720.5 |
| 3,752,010 | 8/1973 | Tipping | 74/687 |
| 3,777,593 | 12/1973 | Mooney, Jr. et al. | 74/687 |
| 3,864,990 | 2/1975 | Lacoste | 74/606 R |
| 3,869,939 | 3/1975 | Miyao et al. | 74/720.5 X |
| 4,164,155 | 8/1979 | Reed et al. | 74/687 |
| 4,164,156 | 8/1979 | Reed | 74/687 |
| 4,286,478 | 9/1981 | Kessinger, Jr. | 74/720.5 X |

Primary Examiner—Kenneth J. Dorner
Assistant Examiner—Dirk Wright
Attorney, Agent, or Firm—Saul Schwartz

[57] ABSTRACT

A cross drive steering transmission has all rotating groups rotatable about a single centerline and includes an input gear at the longitudinal center of the transmission, range gearing on one side of and driven by the input gear, a hydrostatic steer drive on the other side of and driven by the input gear, a first planetary differential gear set outboard of the range gearing having a planet carrier driven by the range gearing and a ring gear drive connected to one output shaft of the transmission, a second planetary differential gear set outboard of the steer drive having a ring gear drive connected to a second output shaft of the transmission, an inner cross shaft drive connecting the planet carriers of the first and second differential gear sets, a steer transfer gear set between the steer drive and the second differential gear set having a sun gear driven by the steer drive and meshing with primary planet gears and secondary planet gears meshing with the primary planet gears and primary and secondary ring gears meshing with the primary and secondary planet gears, and a pair of outer cross shafts around the inner cross shaft drive connecting the primary and secondary ring gears and respective ones of the sun gears in the first and second differential gear sets.

5 Claims, 4 Drawing Figures

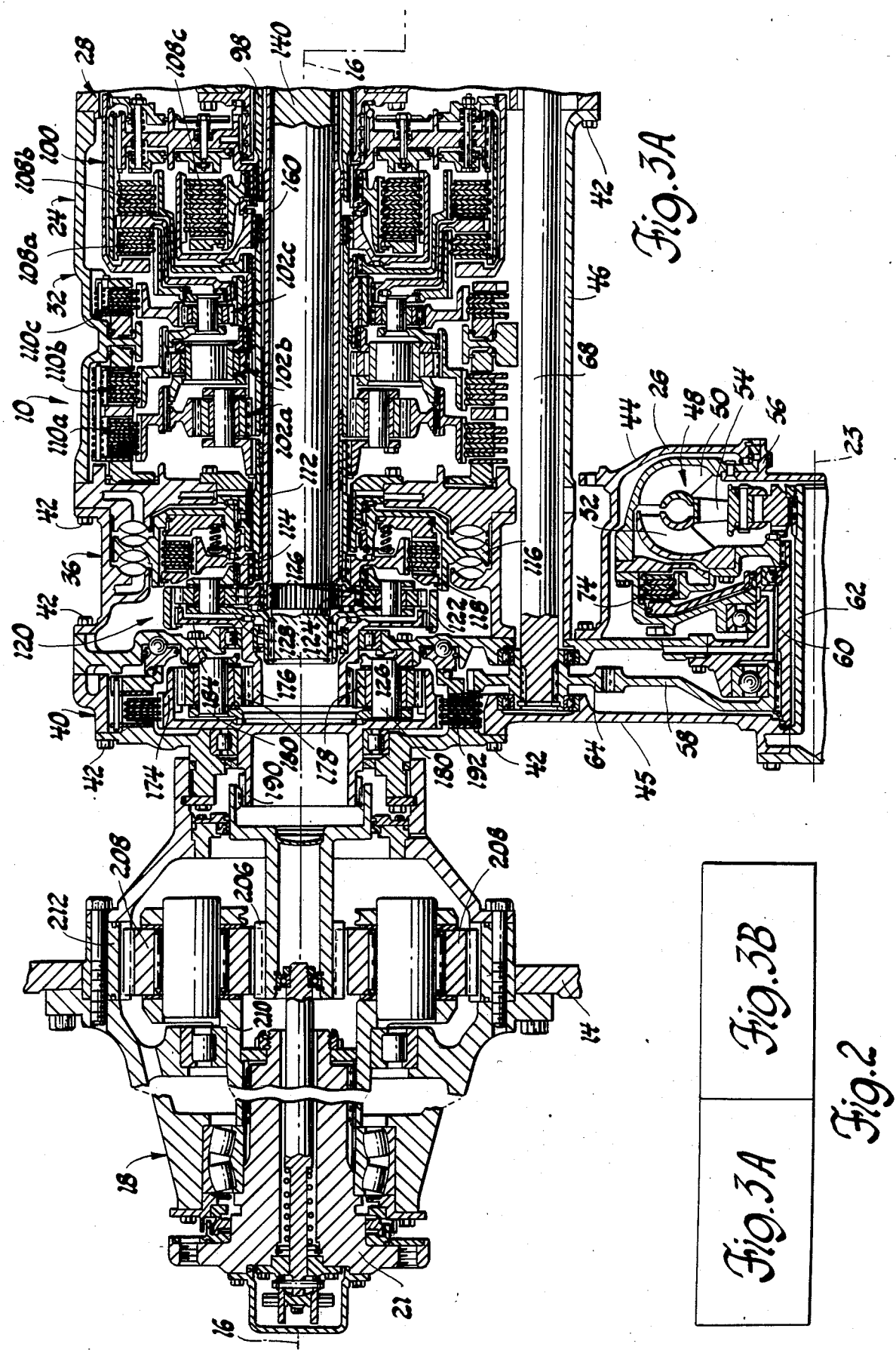

ary steer differential gear sets wherein the ring gears are the drive output members, the planet carriers are the range input members drive connected to the range gearing, and the sun gears are the reaction members drive connected to the steer drive. And a still further feature of this invention resides in the provision in the new and improved transmission of steer transfer gearing including primary and secondary planet gears meshing with each other and rotatable on fixed axes, a sun gear meshing with one of the primary and secondary planet gears and drive connected to the steer drive, and primary and secondary ring gears meshing with respective ones of the primary and secondary planet gears and drive connected to corresponding ones of the reaction members of the steer differential gear sets.

SINGLE CENTERLINE CROSS DRIVE STEERING TRANSMISSION

The invention herein described was made in the course of work under a contract or subcontract thereunder with the Department of Defense.

BACKGROUND OF THE INVENTION

1. Field of the Invention

This invention relates generally to cross drive steering transmissions and, more particularly, to a novel arrangement of modular components whereby single centerline simplicity is achieved.

2. Description of the Prior Art

Cross drive transmissions, widely used in track laying vehicles, typically include rotary power input at the longitudinal centerline of the vehicle and rotary power output shafts at opposite ends of the transmission on a common centerline of the latter extending perpendicular to the vehicle's longitudinal centerline. For steering, a pair of planetary differentials or combining gear sets are provided, each including a rotary power output member connected to the corresponding transmission output shaft, a range input member driven by range gearing in the transmission, and a reaction or steer input member driven in either of two opposite directions by an infinitely variable ratio drive such as a hydrostatic pump/motor unit. To steer the vehicle, a speed differential is created between the transmission output shaft by driving the reaction members of the two combining gear sets at identical speeds but in opposite directions. The combination of rotary power input at the center and rotary power output at opposite ends of the transmission and steering through combining gear sets presents a complex packaging problem which has, in the past, produced transmissions having multiple centerlines about which various component groups of the transmissions rotate. Such multiple centerline transmissions, while functionally adequate, require substantial space within the vehicle and virtually complete disassembly for service. A cross drive steering transmission according to this invention has range gearing, steer drive, steer transfer, and combining gearing packaged in modules on a single centerline and, therefore, represents an improvement over heretofore known cross drive steering transmissions.

SUMMARY OF THE INVENTION

Accordingly, the primary feature of this invention is that it provides a new and improved cross drive steering transmission wherein all rotating component groups of the transmission rotate about a single centerline of the transmission. Another feature of this invention resides in the provision in the new and improved transmission of modularly packaged input gearing, range gearing, steer drive, steer transfer gearing, and steer differential gearing all assembled in end-to-end fashion on a single centerline of the transmission. Still another feature of this invention resides in the provision in the new and improved transmission of an input module generally at the longitudinal center of the transmission, range gearing and steer drive modules on opposite sides of the input module, steer differential gear sets in modules longitudinally outboard of the range gearing and steer drive modules, and steer transfer gearing between one of the steer differential gear sets and the steer drive module, the range gearing being drive connected to a range input member in each steer differential gear set and the steer drive being drive connected through the steer transfer gearing to a reaction member in each steer differential gear set and a drive output member of each steer differential gear set being drive connected to a corresponding one of the transmission output shafts. Yet another feature of this invention resides in the provision in the new and improved transmission of planetary steer differential gear sets wherein the ring gears are the drive output members, the planet carriers are the range input members drive connected to the range gearing, and the sun gears are the reaction members drive connected to the steer drive. And a still further feature of this invention resides in the provision in the new and improved transmission of steer transfer gearing including primary and secondary planet gears meshing with each other and rotatable on fixed axes, a sun gear meshing with one of the primary and secondary planet gears and drive connected to the steer drive, and primary and secondary ring gears meshing with respective ones of the primary and secondary planet gears and drive connected to corresponding ones of the reaction members of the steer differential gear sets.

These and other features of this invention will be readily apparent from the following specification and from the drawings wherein:

FIG. 2 is a block diagram showing the arrangement of FIGS. 3A and 3B; and

Figure 1:
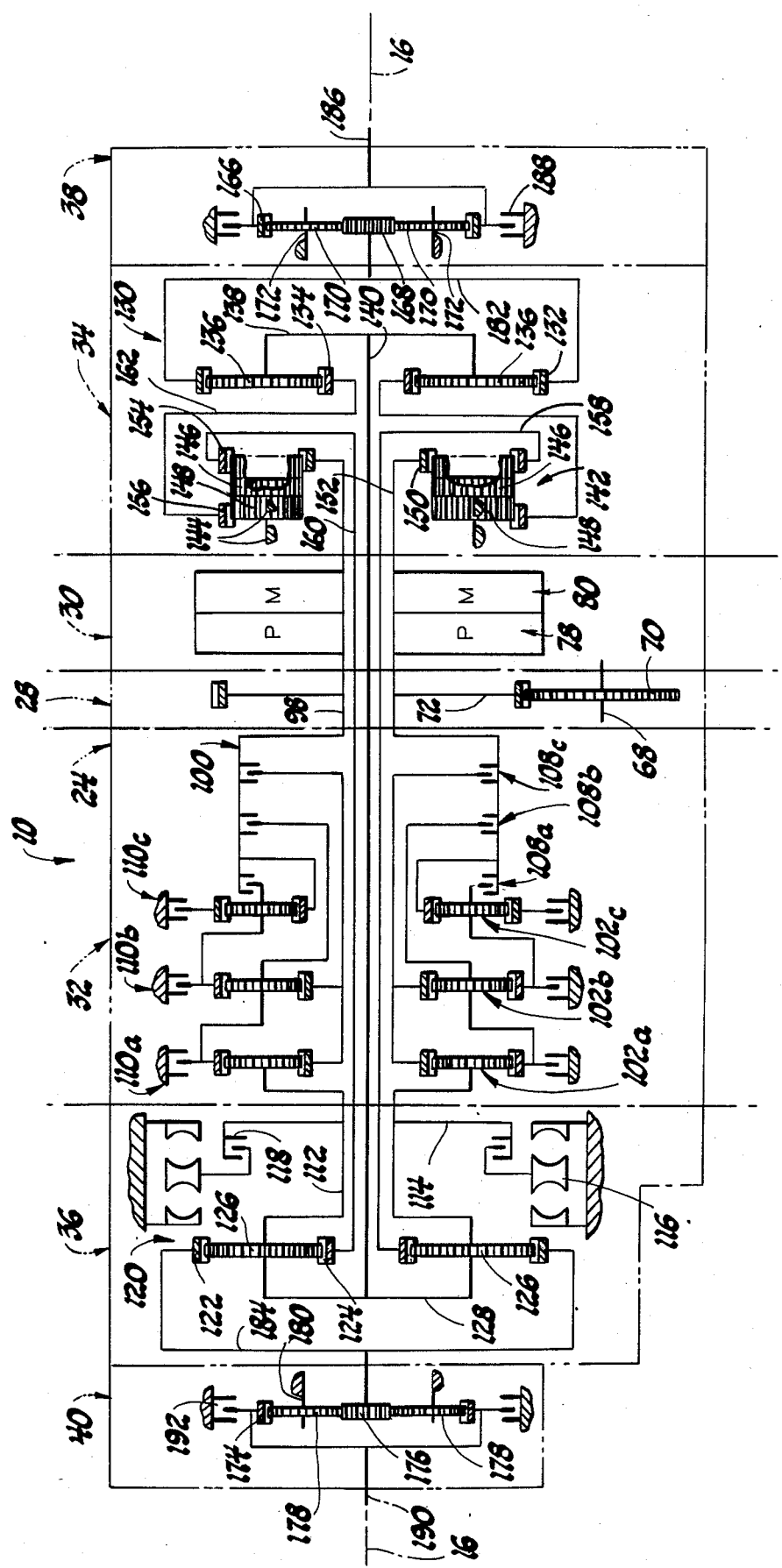
FIG. 1 is a schematic representation of a cross drive steering transmission according to this invention.
Figure 3B:
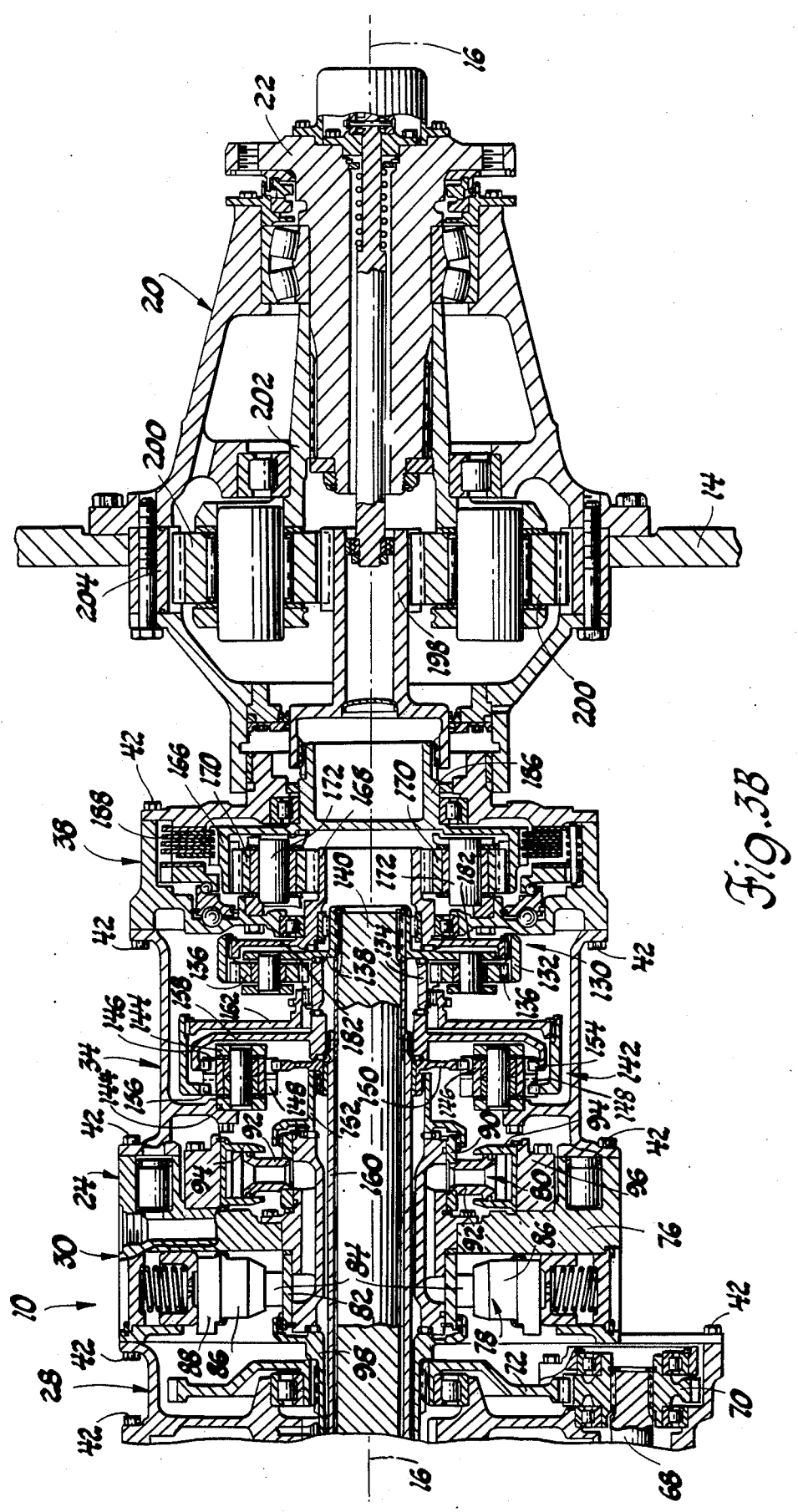

FIGS. 3A and 3B, when combined, are a longitudinal sectional view of a cross drive steering transmission according to this invention as schematically represented in FIG. 1 and further including final drives.

Referring, now, to the drawings wherein like reference characters identify the same component in each of the views, a cross drive steering transmission 10 according to this invention is disposed between a pair of vertical, longitudinally extending hull walls 14 of a track laying vehicle with an output center line 16 of the transmission oriented perpendicular to the hull walls. A pair of final drives 18 and 20, not shown in FIG. 1, bolted to the hull walls 14 in appropriate apertures in the latter structurally support, in known fashion, the transmission 10 at opposite longitudinal ends thereof in the vehicle and align the axis 16 with axes of rotation of a pair of output hubs 21 and 22 in the final drives 18 and 20, respectively, connected to the track sprockets of the vehicle. A prime mover or engine, not shown, of the vehicle is located adjacent the transmission 10 and provides rotary power output at a flywheel, for example at an axis 23, FIG. 3A, parallel to and offset from the axis 16 of the transmission.

The transmission 10 includes a generally cylindrical housing assembly 24 and an offset torque converter housing 26, the housing 26 not being illustrated in FIG. 1. The housing assembly 24 includes an input module 28, a steer drive module 30 adjacent the input module on one side thereof, a range gearing module 32 juxtaposed the input module on the opposite side thereof, a steer transfer/differential module 34 adjacent to and outboard of the steer drive module, a retarder/differential module 36 adjacent to and outboard of the range gearing module 32, a first output reduction module 38 adjacent to and outboard of the steer transfer/differential module 34, and a second output reduction module 40 adjacent to and outboard of the retarder/differential module 36. Each of the aforementioned modules 28 through 40 has a generally cylindrical outer housing which is fastened to the outer housings of the adjacent modules by a plurality of bolts 42. The torque converter housing 26 is symmetrical with respect to the axis 23, only one-half of the housing being illustrated in FIG. 3A, and includes a cover 44 bolted to a transfer case portion 45 of the output reduction module 40. A tube-like enclosure 46 integral with range gearing module 32 extends parallel to the axis 16 between the transfer case 45 and the input module 28.

As seen in FIG. 3A, a torque converter 48 in the housing 26 has an impeller 50, a turbine 52, and a stator 54. Engine power output at the axis 23 rotates the impeller 50 about axis 23 through a coupling 56. The impeller drives the turbine 52 and the turbine drives a first transfer gear 58 through a hollow shaft 60 rotatable about the axis 23. The stator 54 is grounded through a conventional one-way clutch to a stator shaft 62 inside the hollow shaft 60 and rigidly attached to the transfer case 45. The first transfer gear 58 meshes with a second transfer gear 64 rotatably supported in the transfer case and drive connected by splines to one end of a jack shaft 68 extending through the enclosure 46. A third transfer gear 70, FIG. 3B, is rotatably supported on the input module 28 and drive connected by splines to the other end of jack shaft 68 and meshes with an input gear 72 supported in the input module 28 for rotation about the axis 16. Accordingly, rotary power at the axis 23 is transferred from the engine, through the torque converter 48 and into the transmission 10 generally at the center thereof. A hydraulically actuated clutch 74 in the torque converter is operable to rigidly connect the impeller 50 and the turbine 52 under predetermined operating conditions. The arrangement shown and described for applying rotary power to the input gear 72 is representative of arrangements which may be used depending upon the particular prime mover employed and its orientation in the vehicle.

The steer drive module 30 has a rigid support 76 therein on opposite sides of which are located a first radial hydrostatic unit 78, referred to hereinafter or the pump, and a second radial hydrostatic unit 80 referred to hereinafter as the motor. The hydrostatic units 78 and 80 may be constructed in accordance with U.S. Pat. No. 3,274,946, issued Sept. 27, 1966 to E. E. Simmons, and reference may be made to the same for a full and complete description of the units. Generally, the pump 78 has a piston ring 82 rotatable on the support 76 and rigidly carrying a plurality of radially directed pistons 84. Each of the pistons is slidably received in a corresponding one of a plurality of cylinders 86 bearing against an internal surface of a ring 88 supported on the steer module for movement providing variable eccentricity relative to the axis 16. The motor 80 has a piston ring 90 rotatable on the support 76 and rigidly carrying a plurality of radially directed pistons 92. The pistons 92 are slidably received in a corresponding plurality of cylinders 94 bearing against an internal surface of a ring 96 having fixed eccentricity relative to the axis 16. The piston ring 82 is drive connected by splines to a hollow input shaft 98 which, in turn, is drive connected by splines to the input gear 72. The pistons 84 of the pump 78 are internally fluid connected to the pistons 92 of the motor 80 so that fluid pumped from the pistons 84, as the ring 82 is rotated by the input gear 72, rotates the piston ring 90 of the motor 80 in directions and at speeds corresponding to the eccentricity of the ring 88 relative to axis 16. In addition, when the ring 88 is centered about axis 16 the piston ring 90 is immobilized relative to the support 76 and the housing of the steer module 30.

On the opposite side of the input gear 72 from the pump 78, splines provide a drive connection between the opposite end of the input shaft 98 and a drum 100 in the range gearing module 32. A plurality of planetary gear sets 102a, 102b and 102c, each having a sun gear, a ring gear and a plurality of planet gears therebetween rotatably supported on a planet carrier, are connected in various combinations to the input shaft 98 by a plurality of selectively hydraulically actuated rotating clutches 108a, 108b and 108c on the drum 100 and a plurality of selectively hydraulically actuated brakes 110a, 110b and 110c on the housing of the range gearing module 32. A tubular range output shaft 112, drive connected by splines to the planet carrier of the planetary gear set 102a, is rotatable about axis 16 and represents the rotary power output member of the range gearing in module 32. Output torque and speed at the range output shaft 112 are finite multiples of input torque and speed at the input shaft 98 in accordance with the particular power path through the planetary gear sets. The range gearing illustrated herein is representative of planetary type range gearing arrangements generally.

The longitudinally outboard end of the range output shaft 112 is drive connected through splines within the retarder/differential module 36 to a hub 114 of a hydrodynamic retarder rotor 116. The rotor 116 of the retarder is connected to the hub 114 through a hydraulically actuated rotating clutch 118. A first planetary steer differential gear set 120 in the module 36 includes a ring gear 122, a sun gear 124 and a plurality of planet gears 126 meshing with the sun gear and the ring gear and rotatably supported on a planet carrier 128. On the longitudinally inboard side of the differential gear set 120 nearest the range gearing module 32, the planet carrier 128 is drive connected by splines to the hub 114 and, therefore, to the range output shaft 112. The planet carrier 128 is, accordingly, a drive input member of the differential gear set 120.

A second planetary steer differential gear set 130, identical in gear ratio to the gear set 120, is disposed in the steer transfer/differential gear module 34 and includes a ring gear 132, a sun gear 134 and a plurality of planet gears 136 meshing with the sun and ring gears and rotatably supported on a carrier 138. The carrier 138 is drive connected through splines to one end of an inner cross shaft 140 aligned on and rotatable about the axis 16 of the transmission, the inner cross shaft projecting through the centers of the pump 78, the motor 80, the input gear 72, the drum 100, each of the planetary gear sets 102a, b, and c, the retarder hub 114, and the differential gear set 120. At the opposite end thereof, the inner cross shaft 140 is similarly drive connected through splines to the planet carrier 128 of the first combining gear set on the side of the latter opposite the drive connection of the carrier to the hub 114. Accordingly, the carrier 138 of the differential gear set 130, through its drive connection to the carrier 128, represents a drive input member of the differential gear set 130.

A steer transfer gear set 142 is disposed within the steer transfer/differential module 34 longitudinally inboard of the second differential gear set 130 and includes a carrier 144 rigidly bolted to the housing of the module 34. The carrier supports a plurality of primary planet gears 146 for rotation about a corresponding plurality of fixed axes arrayed in a circle around the axis 16 of the transmission. The carrier 144 likewise supports a corresponding plurality of secondary planet gears 148, identical to the primary planet gears, for rotation about a similar plurality of fixed axes arrayed in a circle around the axis 16 of the transmission. Each of the secondary planet gears meshes with a respective one of the primary planet gears and, accordingly, rotates at the same speed as the primary planet gears but in the opposite direction. A sun gear 150 of the steer transfer gear set 142 concentric with axis 16 meshes with each of the primary planet gears 146 and is drive connected by splines to one end of a steer output shaft 152 also concentric with the axis 16, the opposite end of the steer output shaft being drive connected by splines to the piston ring 90 of the motor 80 whereby the sun gear 150 is rotatable as a unit with the piston ring.

The steer transfer gear set 142 further includes a primary ring gear 154 concentric with the axis 16 meshing with each of the primary planet gears 146 and a secondary ring gear 156 concentric with the axis 16 and meshing with each of the secondary planet gears 148. A hub 158, integral with the primary ring gear 154, is drive connected by splines to one end of a first tubular outer cross shaft 160 disposed around the inner cross shaft 140 and rotatable relative thereto, the first outer cross shaft projecting through the centers of the sun gear 150, the motor 80, the pump 78, the input gear 72, the drum 100, the planetary gear sets 102a, b and c, and the range output shaft 112. Longitudinally outboard of the end of the range output shaft, the first outer cross shaft 160 is drive connected through splines to the sun gear 124 of the differential gear set 120 so that the sun gear is rotatable as a unit with the primary ring gear 154. A hub 162 is drive connected by splines to the secondary ring gear 156 and to an extension of the sun gear 134 whereby the sun gear forms a second tubular outer cross shaft and rotates as a unit with the secondary ring gear 156. Accordingly, the steer transfer gear set 142, through each of the first and second tubular outer cross shafts, provides a steer input to each of the differential gear sets 120 and 130 at the reaction members thereof represented by the sun gears 124 and 134.

The first output reduction module 38 houses an output planetary gear set including a ring gear 166, a sun gear 168 and a plurality of pinions 170 supported for rotation on a corresponding plurality of fixed pins 172 attached to the housing of the reduction module 38 and arrayed in a circle around the axis 16. Similarly, the second output reduction module 40 houses a planetary gear set including a ring gear 174, a sun gear 176 and a plurality of pinions 178 rotatably supported on a corresponding plurality of fixed pins 180 attached to the housing of the reduction module and arrayed in a circle around the axis 16. A hub 182, integral with the sun gear 168, is drive connected by splines to the ring gear 132 of the second differential gear set 130 so that the ring gear defines an output member of the second differential gear set. A similar hub 184, integral with the sun gear 176 is drive connected by splines to the ring gear 122 of the differential gear set 120 so that the ring gear 122 defines an output member of the differential gear set. The ring gear 166 is integral with a transmission output shaft 186 which may be selectively braked by a hydraulic brake 188 between the output shaft and the housing of the output reduction module 38. Similarly, the ring gear 174 is integral with an output shaft 190 on the opposite side of the transmission which may be selectively braked by a hydraulic brake 192 between the output shaft 190 and the housing of the reduction module 40.

The output shafts 186 and 190, concentric with axis 16 represents the power output shafts of the transmission 10 and may be connected directly to the final drives 18 and 20, as shown, or may be connected to offset final drives, not shown, through additional transfer gearing. In FIGS. 3A and 3B, each of the final drives 18 and 20 incorporates another planetary gear set to effect further torque multiplication and speed reduction between the output shafts 186 and 190 and the hubs 22 and 21, respectively. More particularly, a sun gear 198 in the final drive 20 is drive connected by splines to the output shaft 186 and meshes with a plurality of pinions 200 rotatably supported on a carrier 202 drive connected by splines to the hub 22. The pinions 200 mesh with a ring gear 204 rigidly attached to the housing of the final drive 20. Similarly, a sun gear 206 is drive connected by splines to the output shaft 190 and meshes with a plurality of pinions 208 rotatably supported on a carrier 210 drive connected by splines to the hub 21 in the final drive 18. The pinions 208 mesh with a ring gear 212 rigidly attached to the housing of the final drive 18.

In operation, engine power rotates the input gear 72 via the torque converter, transfer gears 58 and 64, jack shaft 68, and transfer gear 70. The input gear 72 drives the input shaft 98 and, consequently, the drum 100 in range gearing module 32 and piston ring 82 in pump 78 in the steer drive module 30. The range output shaft 112 is driven at a speed dependent upon which of the clutches 108a, 108b and 108c and brakes 110a, 110b and 110c are hydraulically actuated while the steer output shaft 152 is driven at a speed and in a direction dependent upon the eccentricity of the ring 88 in the pump 78 relative to the axis 16.

For vehicle movement in a straight line, the hubs 21 and 22 in the final drives 18 and 20 must rotate at the same speed and in the same direction. This condition obtains when the ring 88 in the pump 78 is centered on the axis 16 and the steer output shaft 152 is immobilized. More particularly, and sssuming the steer output shaft is immobilized, the range output shaft 112 drives planet carriers 128 and 138 in the differential gear sets 120 and 130, respectively, at the same speed and in the same direction. The sun gears 124 and 134 in the differential gear sets 120 and 130, respectively, being drive connected to the steer output shaft 152 through the sun gear 150, the primary and secondary planet gears 146 and 148, the primary and secondary ring gears 154 and 156, and the first and second tubular outer cross shafts, are immobilized and function as reaction members so that ring gears 122 and 132 are driven at maximum gear reduction at the same speed and in the same direction. Because the ring gears 122 and 132 are drive connected to the hubs 21 and 22, respectively, in the final drives 18 and 20, as described, the hubs are likewise driven at the same speed and in the same direction as required for straight line vehicle movement.

When non-straight line vehicle movement is desired, controls, not shown, stroke the ring 88 in the pump 78 relative to the axis 16 so that the piston ring 90 rotates in one direction or the other depending upon which direction of turn is desired. The piston ring 90, through the steer output shaft 152, rotates the sun gear 150 in the steer transfer gear set 142 causing the primary planet gears 146 to rotate in directions opposite that of the sun gear and the secondary planet gears 156, meshing with the primary planet gears, to simultaneously rotate at the same speed as the primary planet gears but in the same direction as the sun gear 150. Accordingly, the primary ring gear 154 rotates at a speed proportional to the speed of the sun gear 150 but in the opposite direction while the secondary ring gear 156 rotates at the same speed as the primary ring gear and in the same direction as the sun gear. The tubular outer cross shafts, defined by shaft 160 and sun gear 134, being drive connected to the primary and secondary ring gears 154 and 156 of the steer transfer gear set 142, therefore cause the sun gears 124 and 134 in the differential gear sets 120 and 130, respectively, to also rotate at the same speed but in opposite directions. Because their speeds are the same but direction of rotation opposite, one of the sun gears causes the corresponding ring gear to increase in speed by the same amount that the other sun gear causes the corresponding other ring gear to decrease in speed. With a speed differential thus created between the ring gears 122 and 132, and hence between the hubs 21 and 22 in the final drive, one track speeds up while the other slows down so that the vehicle traverses a curved path of motion.

Importantly, the concentricity of all the rotating elements of the transmissions between the output shafts 186 and 190, relative to the axis 16, enables each of the modules 28 through 40 to be subassembled as separate units and joined at a final assembly stage through simple axial attachment as permitted by the various splined drive connections. In addition, the same concentricity relationship and spline connections permit selective disassembly of the transmission at any of the interfaces between any of the modules so that servicing or replacement of a particular module does not necessarily require complete disassembly of the transmission. Accordingly, both initial assembly and field service operations may be efficiently streamlined.

In an alternate embodiment, not shown, of the cross drive steering transmission according to this invention, the steer transfer gear set 142 is modified by removal of the primary and secondary ring gears 154 and 156 and replacement thereof by a secondary sun gear. In the alternative embodiment, the sun gear 150 is displaced toward the hydrostatic motor 80 and meshes with each of the secondary planet gears 148 so that the secondary planet gears rotate opposite the sun gear. In addition, the sun gear 150 is directly drive connected by splines, not shown, to tubular outer cross shaft 160 so that the latter rotates as a unit with the sun gear. The secondary sun gear, not shown, is identical to the sun gear 150 with respect to the number of gear teeth and meshes with each of the primary planet gears 146 whereby the secondary sun gear rotates at the same speed as the sun gear 150 but in the opposite direction. The secondary sun gear is drive connected by splines, not shown, to the second tubular outer cross shaft formed by sun gear 134 whereby steer drive is directed to the differential gear set 130. The alternate embodiment is functionally identical to the preferred embodiment shown in the drawings with the exception that the steer transfer gear set provides no gear reduction.

The embodiments of the invention in which an exclusive property or privilege is claimed are defined as follows:

1. In a single centerline cross drive steering transmission, the combination comprising, housing means defining a centerline, a pair of output shafts at opposite ends of said housing and rotatable on said centerline, input gear means generally at the longitudinal center of said housing means and rotatable about said centerline, multi-ratio range gearing means disposed on one side of said input gear means including a drive input shaft and a drive output shaft rotatable about said centerline, means drive connecting said input gear means and said drive input shaft, infinitely variable ratio hydrostatic steer drive means disposed on the other side of said input gear means including a steer input shaft and a steer output shaft each rotatable about said centerline, means connecting said input gear means and said steer input shaft, a first planetary differential gear set disposed longitudinally outboard of said range gearing means concentric with said centerline and including a range drive input connected to said drive output shaft and a reaction member and a drive output connected to one of said transmission output shafts, a second planetary differential gear set disposed longitudinally outboard of said hydrostatic steer drive means concentric with said centerline and including a range drive input and a reaction member and a drive output connected to the other of said transmission output shafts, an inner cross shaft on said centerline drive connected to each of said range drive inputs of said first and said second differential gear sets, steer transfer gear means disposed between said hydrostatic steer drive means and said second differential gear set concentric with said centerline and including a steer transfer input gear means connected to said steer output shaft and a pair of steer transfer output gear means rotatable in opposite directions at equal speeds, a first outer cross shaft around said inner cross shaft concentric with said centerline drive connecting one of said pair of steer transfer output gear means and said reaction member of said first differential gear set, and a second outer cross shaft around said inner cross shaft concentric with said centerline drive connecting the other of said pair of steer transfer output gear means and said reaction member of said second differential gear set.

2. The combination recited in claim 1 wherein each of said input gear means and said range gearing means and said steer drive means and said first and said second planetary differential gear sets is disposed in a separate module of said transmission and each of said separate modules is rigidly fastened to an adjacent one of said separate modules so that said separate modules cooperate in defining said transmission housing means.

3. The combination recited in claim 2 wherein in each of said first and said second planetary differential gear sets said range drive input is a planet gear carrier and said reaction member is a sun gear and said drive output is a ring gear.

4. The combination recited in claim 3 wherein said steer transfer gear means includes a plurality of primary planet gears supported on said housing means for rotation about fixed axes arrayed in a circle around said centerline, a corresponding plurality of identical secondary planet gears supported on said housing means for rotation about fixed axes arrayed in a circle around said centerline and meshing with respective ones of said primary planet gears, a sun gear concentric with said centerline and drive connected to said steer output shaft meshing with each of one of said plurality of primary and secondary planet gears, a primary ring gear meshing with each of said plurality of primary planet gears and drive connected to said first outer cross shaft, and a secondary ring gear meshing with each of said plurality of secondary planet gears and drive connected to said second outer cross shaft.

5. The combination recited in claim 3 wherein said steer transfer gear means includes a plurality of primary planet gears supported on said housing means for rotation about fixed axes arrayed in a circle around said centerline, a corresponding plurality of identical secondary planet gears supported on said housing means for rotation about fixed axes arrayed in a circle around said centerline and meshing with respective ones of said primary planet gears, a primary sun gear concentric with said centerline drive connected to said steer output shaft and meshing with each of said plurality of secondary planet gears, means drive connecting said primary sun gear and said first outer cross shaft, a secondary sun gear concentric with said centerline and meshing with each of said plurality of primary planet gears, and means drive connecting said secondary sun gear and said second outer cross shaft.

* * * * *